May 2, 1967  B. HAMM  3,317,066
TRAILER VAN AND CONVEYOR
Filed Feb. 11, 1966  2 Sheets-Sheet 1

INVENTOR.
BILLIE HAMM
BY John Cyril Malloy
ATTORNEY.

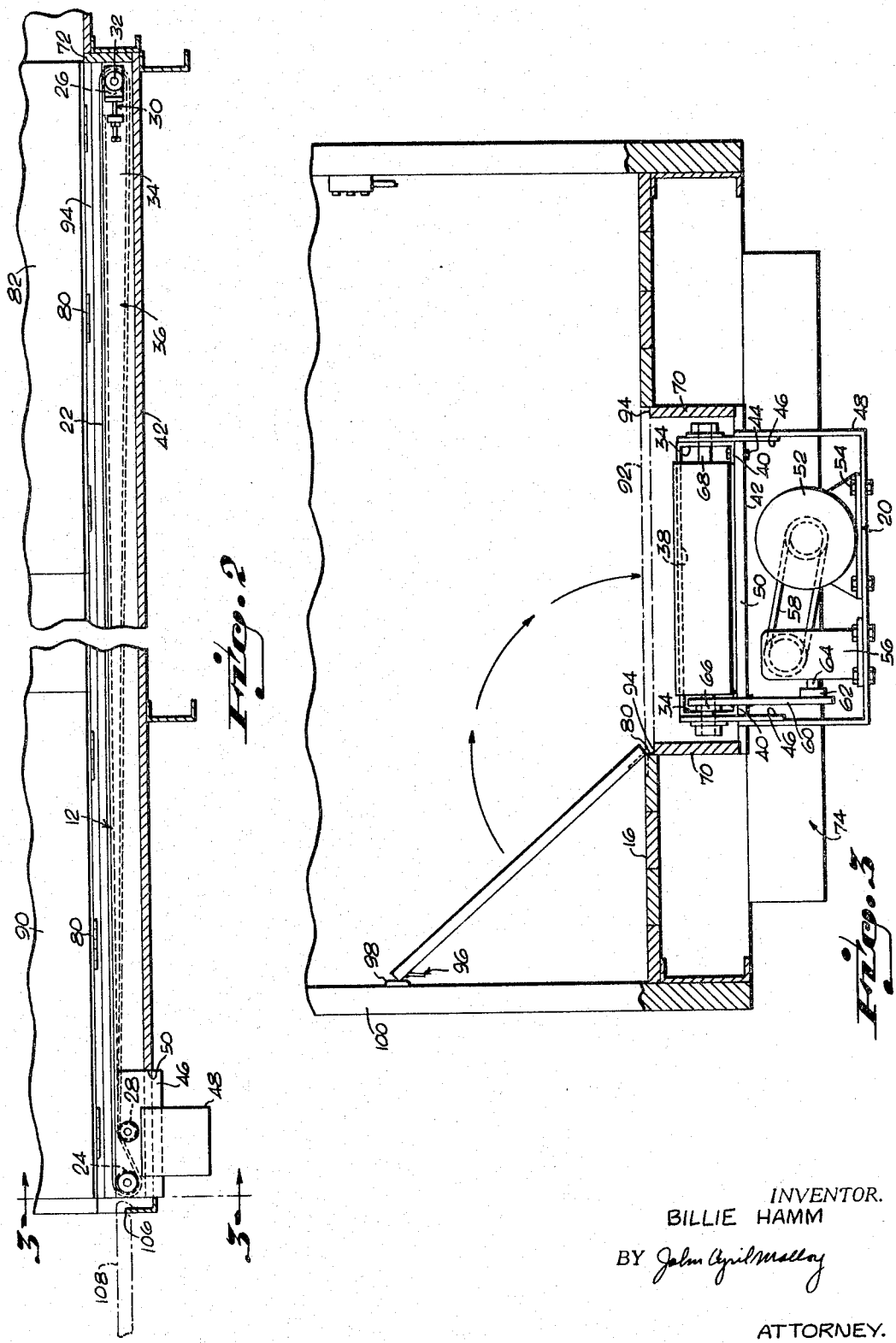

ered May 2, 1967

3,317,066
TRAILER VAN AND CONVEYOR
Billie Hamm, 573 Palmetto Drive, Miami, Fla. 33166
Filed Feb. 11, 1966, Ser. No. 526,754
2 Claims. (Cl. 214—83.36)

The present invention relates to a van-type vehicle of laden and more particularly, to a conveyor system and floor construction arranged in the trailer of the vehicle.

It is a principal object of this invention to provide means for loading and unloading the trailer with a substantial reduction in the work time ordinarily required for such an operation.

It is also an object of this invention to provide means for loading and unloading the trailer with a substantial reduction in the work time ordinarily required for such an operation.

It is also an object of this invention to provide a recessed conveyor in a trailer bed which is longitudinally arranged thereof and extending from the rearward end adjacent the back edge of the bed to the forward end, spaced somewhat rearwardly of the front panel of the trailer.

Another object of the invention is the provision of a series of doors hingedly fixed to the vehicle floor or bed along one longitudinal edge of the conveyor recess which, when open, lie against one vertical side wall of the trailer to expose the conveyor and, when closed, lie in flush or coplanar relation with the main plane of the floor, the doors being adapted to be closed successively from the front of the vehicle to the rear as loading progresses or, alternatively, open successively from the rear end of the conveyor as unloading progresses forwardly.

A still further object of the invention is the provision of a conveyor system in a vehicle which is adaptable for inclusion in existing vehicles of this type; in new vehicle construction it being preferred to provide a chassis or frame to accommodate the conveyor system in recessed relation with the vehicle bed; however, existing vehicles of this type can be converted to incorporate the instant invention by fixing the conveyor to the existing floor and providing an appropriate secondary or load-carrying floor spaced above the existing floor for a distance sufficient to accommodate the conveyor in its appropriate recessed relationship.

For a better understanding of the present invention, together with further objects and advantages which will become apparent, reference is made to the following description of the accompanying drawings in which there is illustrated a preferred embodiment of the invention.

In the drawings,

FIGURE 2 is a longitudinal section view taken along the plane of the line 2—2 of FIGURE 1 and looking in the direction of the arrow;

FIGURE 3 is a view in cross section taken along the plane of the line 3—3 of FIGURE 2 and illustrating the conveyor drive means in its recessed relation in the bed of the trailer or van.

Figure 1:
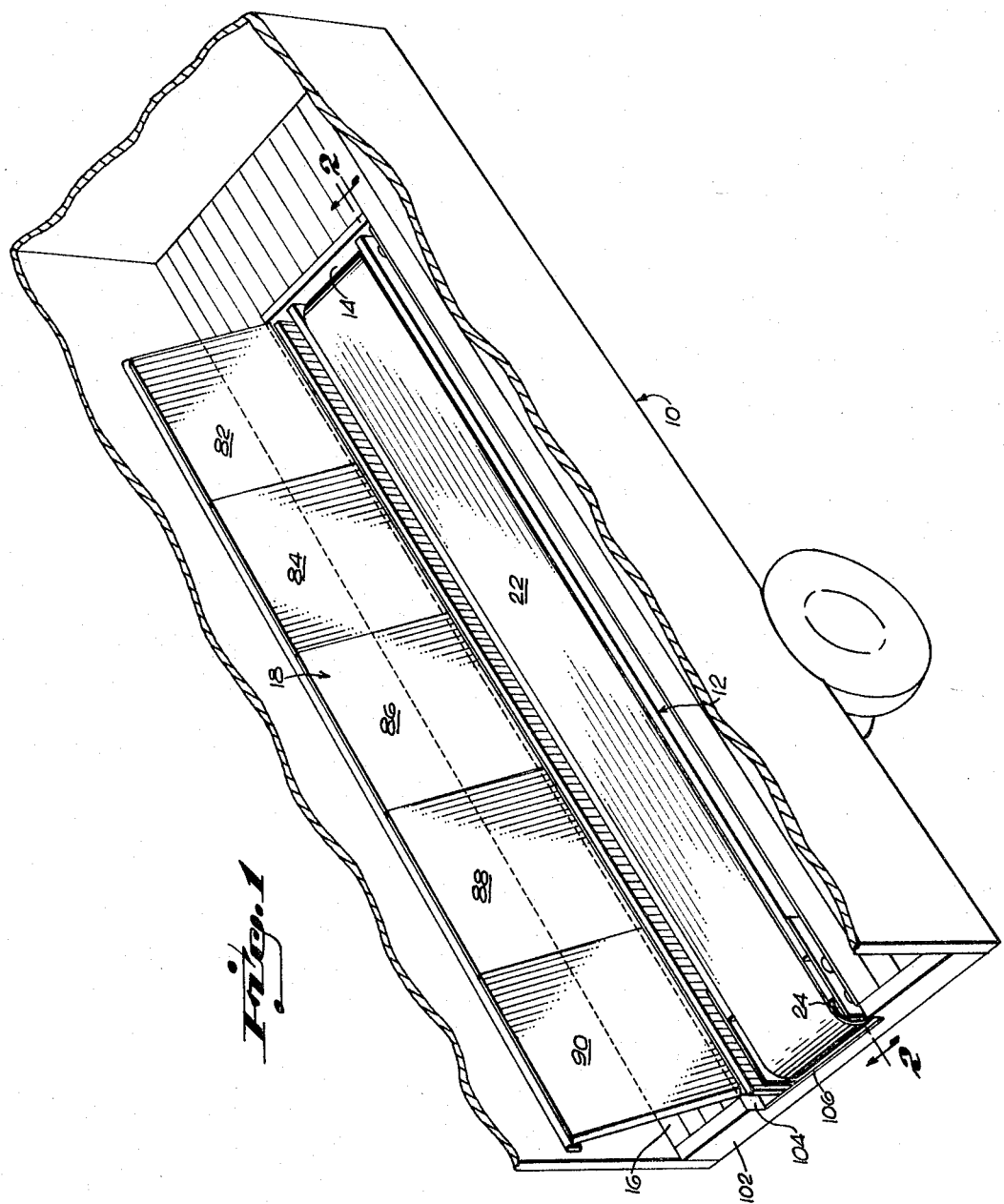
FIGURE 1 is a perspective view of a typical van-type vehicle of laden incorporating the conveyor system of the present invention, the series of doors being in their open position to fully expose the conveyor.

In the following description, like reference numerals designate like or corresponding parts throughout the various views and the numeral 10 designates generally a van-type vehicle of laden such as a truck body or trailer. The conveyor system is composed generally of a power driven belt conveyor 12, disposed within a recess 14 of the vehicle floor 16 and the floor of the vehicle is provided with a series of doors 18, and a drive means 20 to move the conveyor.

The conveyor 12 may be of any conventional heavy duty type providing an endless belt 22 extending from the drive pulley or drum 24, closely adjacent the rear end of the vehicle, to the driven pulley or drum 26 at the forward end thereof. As illustrated an idler pulley or drum 28 adjacent the drive drum 24 and a tensioning means indicated generally at 30 for the driven drum 26 are provided. The tensioning means 30 is provided for each outwardly extended end of the driven drum shaft 32 in the conventional manner and is carried on the side vertical walls 34—34 of the frame 36. The top run of the conveyor belt 22, as illustrated, travels on a flat base 38 to span the side walls 34—34 and is integral therewith; however, a conveyor providing a roller base for the top run of the belt is equally applicable to the present invention. Inwardly turned feet projections 40—40 of the side walls rest on the floor 42 of the recess 14 and are rigidly attached thereto as by the bolts 44.

The drive drum 24 and the idler 28 are mounted in rearwardly extending side plates 46—46 which are welded to the rear ends of the side walls 34—34 of the conveyor frame 36 and, as best illustrated in FIGURES 2 and 3, a U-shaped motor mounting bracket 48 is welded to the bottom portions of the side plate 46—46 and extend downwardly through an appropriate opening 50 in the floor 42 of the recess 14 to carry a motor at 52 which is bolted thereto as at 54. The motor is arranged with a driving connection including a speed reducer 56 by means of a belt or chain 58. A drive chain 60 extends upwardly from a sprocket 62 on the output shaft 64 of the speed reducer, in driving connection with a sprocket 66 fixed to the drive shaft 68 of the drum 24, to drive the conveyor belt at an appropriate rate of speed such as 60 feet per minute. Generally, the loading and unloading of van-type vehicles of this type is performed at appropriate ramps, docks or the like, which are provided with convenient electrical outlets. If, however, a vehicle is to be generally operated to or from a location or locations not provided with electrical outlets, a gasoline engine can be substituted for the electric motor.

The recess 14 in addition to the floor 42 is provided with vertical parallel longitudinal side walls 70—70, spaced outwardly from the conveyor walls 34—34, and a front wall 72 immediately adjacent the front end of the conveyor 12. As previously stated, the recess 14 preferably extends below the normal floor level of the vehicle as provided for by the cross frame members generally indicated at 74 in FIGURE 3. However, in converting an existing vehicle so that it will incorporate the conveyor system of the present invention, the feet 40—40 of the conveyor frame would be fixed to the existing floor and the side wall 70—70 and front wall 72 extending upwardly about the conveyor in the same manner and a secondary floor corresponding to the vehicle floor 16 would be provided to surround the upper edges of the side walls 70—70 and front wall 72.

Referring to FIGURE 1 and 3, the series of doors 18 are hingedly connected to the floor 16, as at 80, along one longitudinal edge of the recess and, while the number of doors is dependent on their width and the overall length of the conveyor, five doors, designated 82, 84, 86, 88 and 90, from front to the back are illustrated. When all five doors are open, the entire conveyor is exposed and when these doors are closed, they become coplanar with the vehicle floor 16 as indicated by the broken lines 92 in FIGURE 3. A pair of steps 94—94 formed by the upper edges of the walls 70—70 and the vertical peripheral faces of the floor along the recesses, provide a solid bearing surface for the doors when closed so that a load may be carried thereover. Any type of handle may be provided to assist in raising and lowering the doors as indicated generally at 96. Preferably, this handle is of a swivel type which can be recessed into the thickness of the doors. Further, a bump rail 98 may be provided along one vertical wall 100 of the trailer at the point of contact by the upper edge of the door when it is opened.

The cross rail 102 at the rear extremity of the floor 16 has a cutout portion 104 to provide a lip 106 to receive the hook on the end of the portable conveyor as shown in broken lines at 108. The facilities at the sight of the loading and unloading operations vary, and, consequently, determine the handling of the cargo prior to loading or after loading. Often a portable conveyor is hooked to the cross rail as described to carry the cargo up to or away from the vehicle or the cargo may be deposited on or picked up from an elevated loading dock or ramp.

In handling general cargo, such as boxes, crates, cartons, barrels, etc., it is preferable to provide the conveyor system centrally of the vehicle as illustrated; however, for certain tyes of cargo it is often preferred to position the conveyor adjacent either side wall or at some intermediate position other than centralized.

In loading the vehicle, cargo is deposited on the rear end of the conveyor and moves forwardly to the front end thereof where it is removed and stacked in the area forward of the conveyor. When this area is filled the door 82 is closed and the cargo is stacked across the area defined by the closing of the door 82. Successively the cargo is packed and the doors are closed in this manner until the vehicle is completely loaded. It will readily be seen that the conveyor always transports the cargo up to the area being filled and, conversely, in the unloading operation, the reverse procedure is applied with the cargo being taken to the rear of the van. The cargo is first removed from the area of closed door 90 directly to the unloading dock, etc.; when this area is cleared the door 90 is opened and the cargo from the area of door 88 is placed on the conveyor for discharge and this procedure is followed with each door area successively until the vehicle is completely unloaded.

While no doors, tailgates or the like are illustrated in the drawing, it is obvious that any type of door, vertical or overhead or hinged tailgate may be provided.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:
1. In combination, a trailer for hauling separate articles of general cargo and a conveyor system secured longitudinally in the trailer, said trailer including side walls and a main floor to support a load, said main floor having a longitudinally extending opening substantially along the length of the floor and terminating adjacent the rear of the trailer, a sub-floor under the opening and side walls supported by the trailer and defining a longitudinally extending receptacle, a plurality of separate hingedly mounted doors along one longitudinal edge of the opening, said doors each being sized to overlay a portion of the opening when the vehicle is loaded and adapted to be opened or closed in sequence to progressively expose or close the receptacle on loading or unloading operation, said conveyor system including, a conveyor means in the receptacle and including a frame having a continuous conveyor base extending from a point adjacent one end of the receptacle to the other end of the receptacle, a drive drum adjacent one end of the receptacle and a driven drum adjacent the other end of the receptacle, said drums having parallel shafts, and an endless belt spanning the drums and supported along the length thereof by said base, said base being disposed slightly below the main plane of said trailer floor, tensioning means carried on the frame to move the driven and driving drums apart with their axes parallel to one another to tighten said belt, and drive means connected to said conveyor to move the conveyor continuously, and said side walls having a continuous recess at the floor plane defining a depressed lip to nest and support the marginal edges of said doors so that the doors, when closed, are flush in the main plane of the trailer floor, whereby a vehicle may be loaded and unloaded by positioning articles on the conveyor for movement along the floor of the vehicle and the doors are dimensioned relative to the trailer floor and the receptacle width such that when folded out of the plane of the floor the swinging edge rests against the longitudinally extending side walls of the trailer and bumper means are provided to cushion the swinging edge of the doors along the line of contact with the trailer.

2. The combination as set forth in claim 1 wherein said drive means includes a motor and speed reducer means carried by the trailer to drive the conveyor independently of a towing unit.

References Cited by the Examiner
UNITED STATES PATENTS

| | | | |
|---|---|---|---|
| 1,928,859 | 10/1933 | Kutcha | 214—83.36 X |
| 2,507,252 | 5/1950 | Hoover | 214—83.36 |
| 2,682,959 | 7/1954 | Regier | 214—83.36 |
| 2,784,854 | 3/1957 | Roberts | 214—83.36 |
| 2,816,797 | 12/1957 | Hanson | 214—83.2 X |
| 3,000,521 | 9/1961 | Deputy | 214—83.36 X |
| 3,107,804 | 10/1963 | Cox | 214—83.36 X |

GERALD M. FORLENZA, *Primary Examiner.*
ALBERT J. MAKAY, *Examiner.*